United States Patent [19]

Anderson

[11] Patent Number: 4,920,874
[45] Date of Patent: May 1, 1990

[54] METHOD AND APPARATUS FOR COOKING AND ADVERTISING FOOD PRODUCTS

[76] Inventor: Edward M. Anderson, 2620 East Medicine Lake Blvd., Minneapolis, Minn. 55441

[21] Appl. No.: 270,687

[22] Filed: Nov. 14, 1988

[51] Int. Cl.⁵ ............................................. A47J 37/12
[52] U.S. Cl. ........................................ 99/403; 99/407; 99/409; 99/341; 99/342; 40/613
[58] Field of Search ................. 99/403, 404, 405, 407, 99/409, 341, 342, 343, 344, 285; 40/426, 613; 116/175, 215

[56] References Cited

U.S. PATENT DOCUMENTS

| | | | |
|---|---|---|---|
| 1,688,278 | 10/1928 | Kenkel | 40/613 |
| 3,022,594 | 2/1962 | Wendell | 40/613 X |
| 3,283,695 | 11/1966 | Belshaw et al. | 99/407 X |
| 3,329,081 | 7/1967 | Roth | 99/407 X |
| 3,494,321 | 2/1970 | Moore et al. | 219/453 X |
| 4,176,590 | 12/1979 | Kochan | 99/405 |
| 4,594,941 | 6/1986 | Anderson | 99/334 |
| 4,658,709 | 4/1987 | Anderson | 99/407 X |

FOREIGN PATENT DOCUMENTS

| | | | |
|---|---|---|---|
| 732733 | 6/1932 | France | 40/613 |
| 11621 | 6/1899 | United Kingdom | 40/613 |

*Primary Examiner*—Stephen Marcus
*Assistant Examiner*—Christine A. Peterson
*Attorney, Agent, or Firm*—Henry C. Kovar

[57] ABSTRACT

A combination food cooking and advertising machine has a deep fat fryer, mechanical food manipulators in the fryer for dispensing, flipping and removing the food product, and motionless advertising signs which are mechanically connected to and are given motion by operation of the food manipulators. This sign has a slip-on bracket, and sign plates and drive arm that can be driven by the food cooker. A method of operation and a method of converting an existing fryer into the cooking and advertising machine are provided. The method and apparatus are particularly useful in miniature donut making and selling.

23 Claims, 2 Drawing Sheets

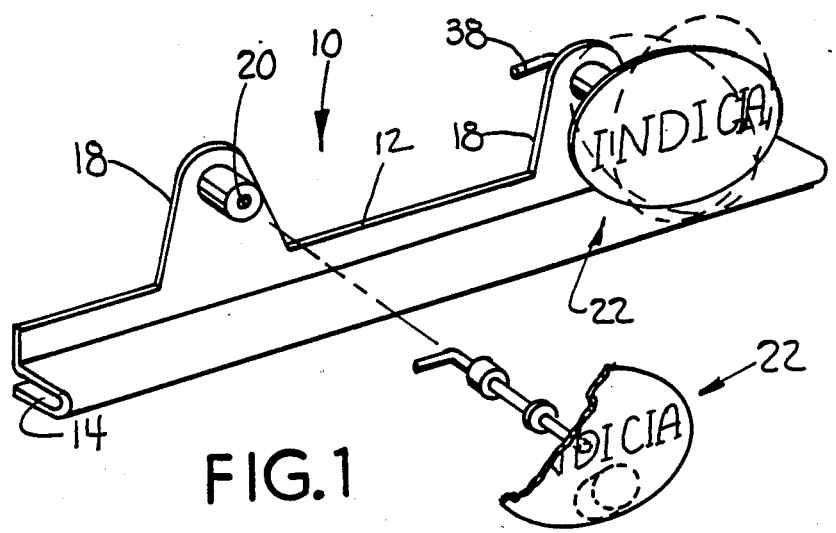
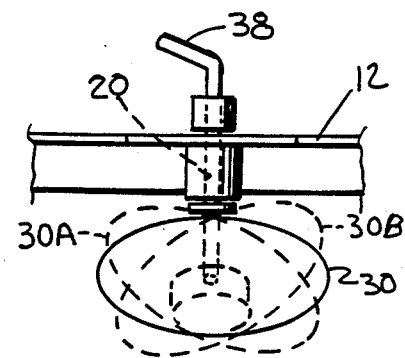
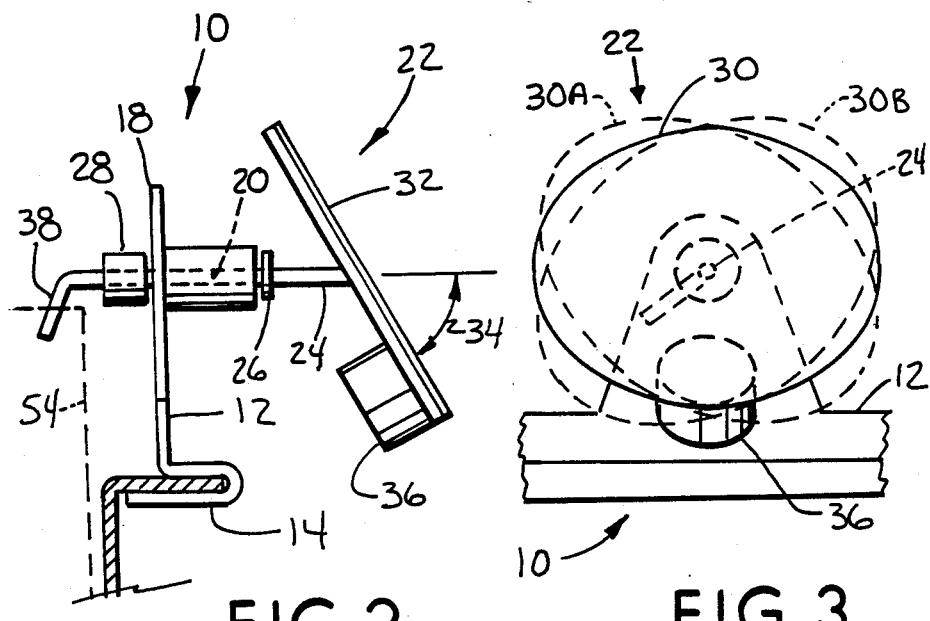
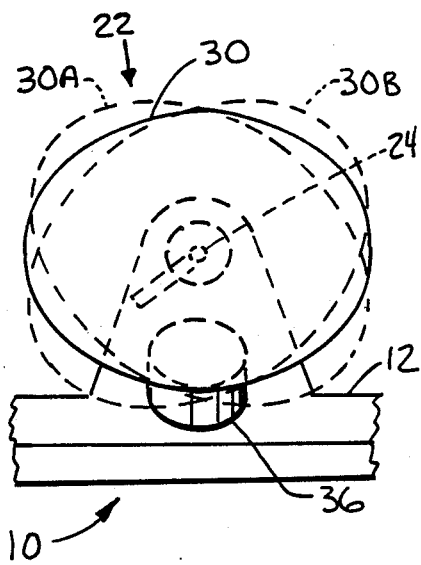
FIG. 1
FIG. 4
FIG. 2
FIG. 3

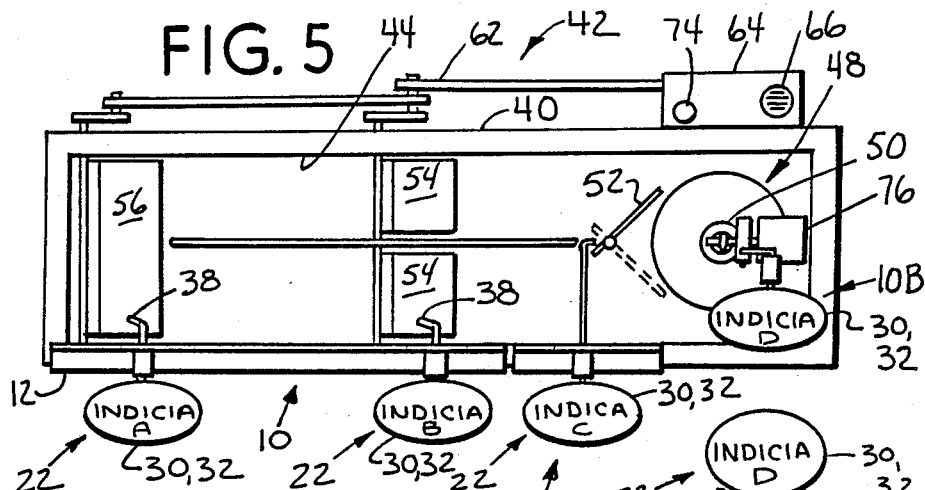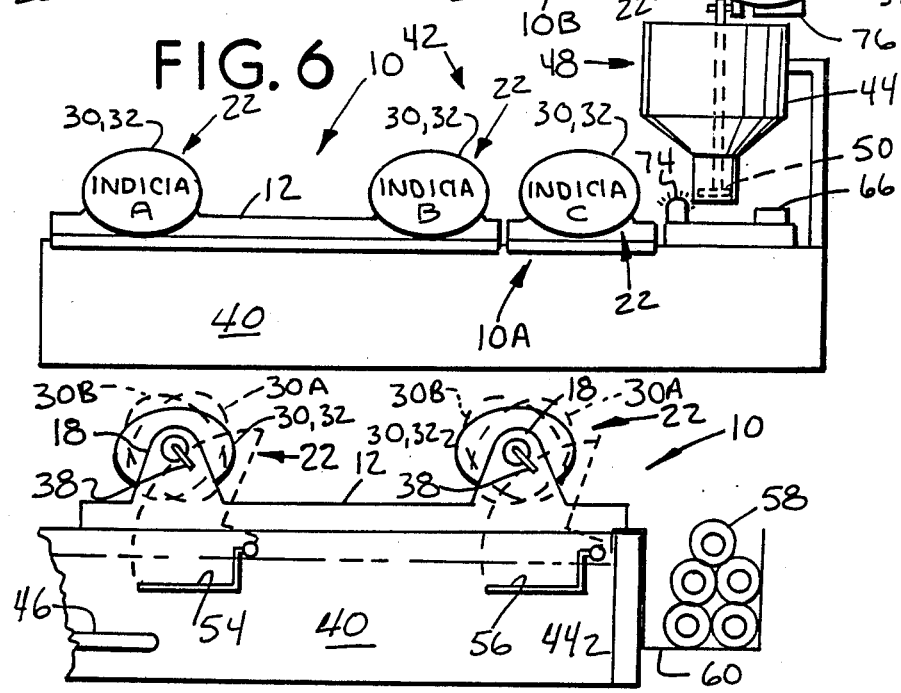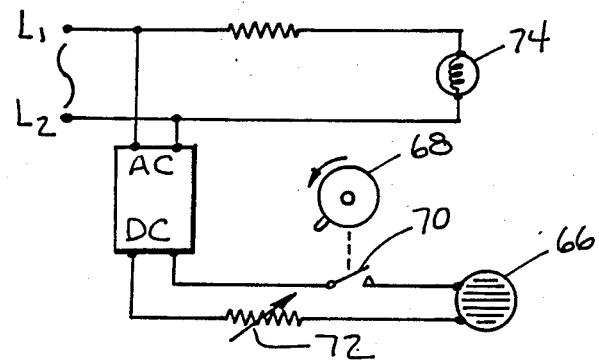

METHOD AND APPARATUS FOR COOKING AND ADVERTISING FOOD PRODUCTS

BACKGROUND OF THE INVENTION

1. FIELD OF THE INVENTION

This invention pertains to a method of an apparatus for both cooking and advertising a food product, to an advertising sign to be mounted on and to be mechanically driven by the food cooker, and to a method of converting a food cooker into a combination food cooker and advertising apparatus.

2. THE PRIOR ART

Small point of sale food cooking machines for making donuts, donut holes, and other miniature pastry and bakery items have been known and used for many years. Many of these machines are my work product and are used primarily to make miniature donuts.

The machines and the food products have been and are a source of joy, a fun event, entertaining, and in general, most people are fascinated by the machines and the food product. Most people enjoy watching these machines make and cook the food products.

As a general rule of thumb, the more people that watch the machine, the more food product is sold and the more enjoyment and profit are produced.

OBJECTS OF THE INVENTION

It is an object of this invention to provide a new method of and apparatus for both cooking and advertising a food product, wherein a normally motionless advertising sign is mechanically driven by the movable components of the food cooker.

It is an object of this invention to provide a new non-electric motion producing advertising sign for a food cooker.

It is an object of this invention to provide a method of converting a food cooker into a combination food cooking and advertising machine with a motion producing advertising sign.

SUMMARY OF THE INVENTION

Apparatus for cooking and advertising food products has a deep fat fryer, a food dispenser for dispensing food portions into the fryer, a mechanism on the fryer for manipulating the food product while in the fryer, at least one movable advertising sign which is normally motionless, and a sign drive structure operatively connecting the food manipulating mechanism to the sign for providing power to give the sign motion.

A food cooking advertising sign has a bracket, a bracket mount for fastening the sign on a food cooker having at least one mechanical food manipulator, a fulcrum in the bracket, an advertising sign movably mounted in the fulcrum, and a mechanical drive extending from the sign and the bracket to engage the mechanical food manipulator for providing motion to the sign.

A method of cooking and advertising a food product has the steps of heating the cooking oil in a food fryer, dispensing a portion of food product into the heated oil, mechanically manipulating the food product while it is in the oil, and moving an advertising sign with the mechanical food manipulator during operation of the fryer.

A method of converting a food cooker into a combination food cooking and advertising machine has the steps of affixing a sign bracket to the machine, positioning a normally motionless sign adjacent a frying vat of the machine, providing a mechanical sign drive connected to and co-movable with the sign, and positioning the sign drive in the movement path of a food manipulator mechanism in the fryer, for getting power from the food manipulator to give motion to the sign.

Many other advantages, features and additional objects of the present invention will become manifest to those versed in the art upon making reference to the detailed description and accompanying drawings in which the preferred embodiment incorporating the principles of the present invention is set forth and shown by way of illustrative example.

BRIEF DESCRIPTION OF THE DRAWINGS

FIG. 1 is a perspective view looking down at the advertising sign of the present invention;

FIG. 2 is an end elevational view thereof;

FIG. 3 is a front elevational view thereof;

FIG. 4 is a top plan view thereof;

FIG. 5 is a top plan view of a food cooking and advertising machine utilizing the sign of FIG. 1;

FIG. 6 is a front elevational view of the machine of FIG. 5;

FIG. 7 is a rear elevational view, in section, of the machine of FIG. 5; and

FIG. 8 is a wiring schematic of the machine of FIG. 5.

DESCRIPTION OF THE PREFERRED EMBODIMENT

According to the principles of the present invention, a normally motionless and non-electric food advertising sign is shown in FIGS. 1-4 and generally indicated by the numeral 10. The sign 10 has an elongate bracket 12 with a generally U-shaped clip section 14 that slips onto and off of a metal flange 16 of a food fryer for securement and positional fixing of the sign 10. The bracket has at least one and preferably a pair of pedestals 18. Each pedestal 18 has a fulcrum 20. A sign, generally indicated by the numeral 22, is movably mounted in each fulcrum 20.

Each sign 22 has a shaft 24 which is held in the journal 20 by a front retainer 26 and a rear retainer 28. On the front end of the shaft 24 is a sign plate 30 which carries indicia and/or an advertising print 32 thereon. The plate 30 and print 32 are preferrably round and are mounted to the shaft 24 at an angle 34 which is preferrably in the range of thirty to sixty degrees. At the bottom of the plate 30 is a pendulum weight 36 which biases and tends to keep the sign motionless with the bottom edge of the plate 30 being the furthest out and the upper edge being the furthest back. It has been found that the plate 30 is very effective when flat.

On the back end of the shaft 24 is a drive arm 38 which preferrably extends generally normal to the shaft 24 and downward. The sign 22 is free to rotate in the fulcrum 20, but normally sits motionless. The complete sign 10 may have only one advertising sign element 22, or two or more as is shown in FIG. 1. When the sign plate 30 is given motion, as will subsequently be explained, the sign plate 30 goes into an interesting, attractive, and difficult to follow movement. The sign plate 30 rotates first clockwise and then counter-clockwise and repeats this movement under the pendulum effect of the weight 36. The front of the sign plate 30 and the print 32 look to have a wobble or rotating movement that starts out at maximum value and declines to zero, and then is started again at a maximum movement as will be explained. As shown in FIGS. 3 and 4, the sign plate 30 is firstly moved to an alternate position 30A from which the plate 30 is rotated to second alternate position 30B by the weight 36. The plate 30 continues to rotate back and forth until the weight 36 eventually stops at the bottom, whereupon its pendulum motion stops.

FIGS. 5, 6 and 7 illustrate a food fryer 40 having the sign 10 thereon to form the complete food cooking and advertising machine, generally indicated by the numeral 42 of the present invention.

The cooking fryer 40 is a hot fat type food fryer having a vat 44 which preferably has an internal electric heating element 46 for heating cooking oil 48 in the vat 44. A dough dispenser 48 is positioned above an inlet end of the fryer 40 to dispense and drop individual portions of food product into the hot fat 48 in the vat 44. The dispenser 48 has a piston valve 50 and a drive motor 52. A specific dough dispenser is shown and disclosed in my U.S. patent application Ser. NO. 180,390 filed Apr. 08, 1988, the teachings of which are included herein by reference. The fryer 40 may be a single track or a dual track as shown in FIG. 5. If a dual track, the fryer 40 will have a mechanical food diverter 52 to divert and manipulate the food product into the proper frying channel. The fryer 40 will have a mechanical flipper 54 to manipulate the food product during cooking and turn it over so that both sides of the food product are properly cooked. The outlet end of the fryer 40 will have some type of mechanical food lift 56 to manipulate and lift the cooked food product 58 up and out of the hot oil 48 and into a basket 60. The preferred food lift 56 is an ejector flipper as shown, but it may be an elevator chain or other type of device. The flipper 54, the lift 56, and the diverter 52 may all be connected by a linkage 62 to a drive motor (not shown) associated with a fryer control 64. A specific example of a fryer 40 is shown in my U.S. Pat. No. 4,658,709, the teachings of which are included herein by reference.

In the conversion of the fryer 40 into the food cooking and advertising machine 50 of the present invention, and in the practice of the methods of the present invention, the sign 10 is mounted upon the fryer 40 as seen best in FIG. 5 and as best shown in detail in FIG. 2. The sign 10 is fixed in position on the fryer 40 so that the drive arms 38 are in the path of the flipper 54 and lift 56 as best shown in FIG. 7. When the flippers 54 and lift 56 are moved up, they hit the respective drive legs 38 and move the sign plates 30 to positions 30A in FIG. 7; the plates 30 then rotate back and forth until they come to rest. When the flipper 54 and lift 56 are returned down into the vat 44, the drive arms 38 are hit again and the plates 30 move to position 30B and then continue to rotate until they come to a stop. The flipper 54 and lift 56 supply the entirety of the motive power to give motion to the sign 10. The drive arm 38 yields to the intrusion of the respective flipper 54 or lift 56 during manipulation of the food products. It should also be noted that during periods of slow sales or when selling cooked food product from inventory, the dispenser 48 can be shut off and the flipper 54 and lift 56 can continue to operate and continually present advertising with motion to attract customers. The sign 10 is easily removed from the fryer 10 and can be discretely cleaned in a dishwasher. The plates 30 and prints 32 face directly against the eyes of a potential customer peering at the machine 42 and provide very appealing motion.

The fryer 40 is operated by an electronic control 64 which is shown and disclosed in my U.S. Pat. No. 4,594,941, the teachings of which are incorporated herein by reference. The machine 42 is provided with additional attention getting and selling features which appeal to other senses. The sign 10 attracts the visual sense. An accoustical chirper 66 is provided to appeal to the acoustic senses and a cycle light 74 further attracts the visual sense.

The new wiring in the control is shown in FIG. 8 A cam 68 operates a switch 70 each time the control 64 cycles to actuate the chirper 66. A potentiometer 72 provides adjustment of the chirper 66 loudness from zero to a maximum value. The cycle light 74 is normally off and is momentarily pulsed on during each cycle of the control 64 to indicate the machine 42 is operating and to draw customers from beyond the effective visual range of the sign 10.

The machine 42 may have an alternative sign 10A mounted adjacent and/or mechanically operated by the diverter 52. The machine 42 may also have a further optional sign 10B mechanically operated by the dispenser motor 76.

The machine 42 operates cyclically, and during operation of the food manipulators 48, 52, 54, 56, the sign plate 30 and prints 32 are given considerable movement. The chirper 66 and cycle light 74 may also be operated. The motion and movement are very attractive and fascinating, and very effective for entertaining people and for selling the food product 58 which may be miniature donuts.

Although other advantages may be found and realized and various modifications may be suggested by those versed in the art, it should be understood that I wish to embody within the scope of the patent warranted hereon, all such embodiments as reasonably and properly come within the scope of my contribution to the art.

I claim as my invention:

1. Apparatus for cooking and advertising food products, comprising:
   (a) a deep fat fryer having a cooking vat and a heater for heating of cooking oil in the fryer;
   (b) food dispenser means for dispensing a portion of food product into said vat;
   (c) mechanical means on the fryer for manipulating the food product while in the cooking vat;
   (d) at least one advertising sign movably mounted with respect to fryer, said sign being normally motionless; and
   (e) sign drive structure operatively connecting said sign to at least one of said means, for movement of the sign by the said one of said means to call attention to the food product and operation of the fryer.

2. The apparatus of claim 1, including a plurality of said signs, each said sign being independently movable and having a discrete said drive structure.

3. The apparatus of claim 1, in which said sign includes a shaft rotatably mounted in a fulcrum, and a plate mounted to one end of said shaft, said plate being skewed with respect to said shaft.

4. The apparatus of claim 3, including a weight on the plate, said weight being adjacent that part of the plate which is furthest from the shaft.

5. The apparatus of claim 4, including a print on the plate, said print and said shaft being on opposite sides of the plate.

6. The apparatus of claim 1, in which said sign and drive structure are mounted upon a discrete bracket, said bracket having a clip for securement to said fryer.

7. The apparatus of claim 1, including electrically powered indicating means for indicating cyclical operation of the fryer while the sign is being moved.

8. The apparatus of claim 7, in which said indicating means include a cycle light and an acoustical device.

9. The apparatus of claim 1, in which said mechanical means for manipulating the food product comprises at least one food flipper, said sign drive structure being operatively connected to said flipper.

10. A food cooking machine advertising sign, comprising:
   (a) a bracket;
   (b) mounting means on the bracket for attaching and fixing the bracket on a food cooking machine having at least one mechanical food manipulator for manipulating a food product during cooking thereof;
   (c) a fulcrum in said bracket;
   (d) an advertising sign movably mounted in said fulcrum;
   (e) mechanical drive means co-movable with and extending from said sign, said drive means having means for mechanically engaging the food manipulator for co-movement of the sign with each movement of the food manipulator.

11. The sign of claim 10, in which said sign includes a shaft in said fulcrum and a plate mounted on one end of said shaft, said plate being skewed with respect to said shaft.

12. The sign of claim 11, in which said plate is round.

13. The sign of claim 11, including a weight secured to the shaft side of said plate, said weight being adjacent that part of the plate which is furthest from the shaft.

14. The sign of claim 10, in which said bracket includes a pedestal extending upward from said mounting means, said fulcrum being on said pedestal.

15. The sign of claim 10, including two of said fulcrums and two of said signs, each sign having its own drive means and being independently movable.

16. A method of cooking and advertising food product, comprising the steps of:
   (a) heating cooking oil in a deep fat fryer cooking vat to a cooking temperature;
   (b) dispensing a portion of food product from a mechanically movable dispenser into the heated oil;
   (c) mechanically manipulating the cooking food product with a lifting mechanism while in the heated oil for complete cooking of the food product and for removing the cooked food product from the hot oil;
   (d) moving a normally motionless advertising sign with one of the dispensers or the lifting mechanism to attract attention to the food product and operation of the fryer.

17. The method of claim 16, including the further step of moving a pair of independently operable said signs with the lifting mechanism.

18. The method of claim 16, including the further steps moving the sign a first time during lifting of food product, and moving the sign a second time during lowering of the lifting mechanism.

19. The method of claim 16 including the further steps of actuating illumination and acoustic emitters while moving the signs.

20. The method of claim 16, including the further step of causing a wobble motion of said sign.

21. A method of converting a food cooking machine into a combination food cooking machine and advertising sign carrier and driver, wherein the machine has a deep fat frying vat, a food product dispenser, and a mechanical food product manipulation device for moving and lifting the food product in the vat, comprising the steps of:
   (a) affixing a sign bracket to the cooking machine;
   (b) positioning a normally motionless sign adjacent the frying vat with the bracket, said sign having been movably mounted in the bracket;
   (c) providing a mechanical sign drive which is connected to and which is co-movable with the sign;
   (d) positioning the sign drive in the movement path of one of the dispenser or the manipulation device, and obtaining power for movement of the sign by obstructing the said movement path and thereafter yielding to the intrusion of the said one of the dispenser or manipulation devices.

22. The method of claim 21, including the further step of skewing the sign with respect the cooking machine.

23. The method of claim 21, including the further step of connecting a cyclically operable illumination device and a cyclically operable acoustic device to control means of operating the manipulation drive.

* * * * *

UNITED STATES PATENT AND TRADEMARK OFFICE
CERTIFICATE OF CORRECTION

PATENT NO. : 4,920,874  Page 1 of 2

DATED : May 1, 1990

INVENTOR(S) : Edward M. Anderson

It is certified that error appears in the above-identified patent and that said Letters Patent is hereby corrected as shown below:

Column 2, lines 53 through 59 should read as follows:

-- being the furthest back. It has been found that the plate 30 is very effective when flat.

On the back end of the shaft 24 is a drive arm 38 which preferably extends generally normal to the shaft 24 and downward. The sign 22 is free to rotate in the fulcrum 20, but normally sits motionless. The complete sign 10 may have only one advertising sign element 22, --.

Column 4, lines 53 through 59 should read as follows:

-- sign to at least one of said means, for movement of the sign by the said one of said means to call attention to the food product and operation of the fryer.

2. The apparatus of claim 1, including a plurality of said signs, each said sign being independently movable and having a discrete said drive structure.

UNITED STATES PATENT AND TRADEMARK OFFICE
CERTIFICATE OF CORRECTION

PATENT NO. : 4,920,874
DATED : May 1, 1990
INVENTOR(S) : Edward M. Anderson

It is certified that error appears in the above-indentified patent and that said Letters Patent is hereby corrected as shown below:

```
   3.  The apparatus of claim 1, in which said sign in-
--.
```

Signed and Sealed this

Twenty-sixth Day of October, 1993

Attest:

BRUCE LEHMAN

Attesting Officer     Commissioner of Patents and Trademarks